United States Patent
Sandock et al.

(10) Patent No.: US 9,424,797 B1
(45) Date of Patent: Aug. 23, 2016

(54) DRIVING ELECTRO-OPTIC DISPLAYS

(71) Applicant: Dock Technologies Inc., Madison, WI (US)

(72) Inventors: Sarah R. Sandock, Milwaukee, WI (US); Nicholas S. Levin, Waupun, WI (US)

(73) Assignee: Dock Technologies Inc., Madison, WI (US)

( * ) Notice: Subject to any disclaimer, the term of this patent is extended or adjusted under 35 U.S.C. 154(b) by 0 days.

(21) Appl. No.: 14/943,534

(22) Filed: Nov. 17, 2015

(51) Int. Cl.
*G09G 5/00* (2006.01)
*G09G 3/38* (2006.01)
*G09G 3/20* (2006.01)
*G06F 1/16* (2006.01)

(52) U.S. Cl.
CPC ............. *G09G 3/38* (2013.01); *G06F 1/163* (2013.01); *G09G 3/2003* (2013.01); *G09G 2310/0243* (2013.01); *G09G 2310/08* (2013.01); *G09G 2330/021* (2013.01)

(58) Field of Classification Search
CPC ............. G09G 3/38; G09G 3/2003; G09G 2310/0243; G09G 2310/08; G09G 2330/021; G06F 1/163
See application file for complete search history.

(56) References Cited

U.S. PATENT DOCUMENTS

| | | | |
|---|---|---|---|
| 4,117,475 A | 9/1978 | Ebihara et al. | |
| 4,129,861 A * | 12/1978 | Giglia | G09G 3/19 345/49 |
| 4,302,751 A | 11/1981 | Nakauchi et al. | |
| 4,462,026 A * | 7/1984 | Munday | G09G 3/04 345/204 |
| 4,511,894 A * | 4/1985 | Johnston | G09G 3/04 345/204 |
| 4,651,148 A | 3/1987 | Takeda | |
| 5,648,793 A | 7/1997 | Chen | |
| 5,973,819 A * | 10/1999 | Pletcher | G09G 3/38 351/44 |
| 6,210,008 B1 | 4/2001 | Hoekstra et al. | |
| 6,547,404 B2 | 4/2003 | Schierbeek | |
| 7,292,214 B2 | 11/2007 | Bolotsky | |
| 7,528,822 B2 * | 5/2009 | Amundson | G02F 1/167 345/107 |
| 7,733,311 B2 * | 6/2010 | Amundson | G02F 1/167 345/101 |
| 8,576,476 B2 | 11/2013 | Telfer et al. | |
| 8,681,416 B2 * | 3/2014 | Suwald | G02F 1/167 345/107 |
| 2005/0024353 A1 * | 2/2005 | Amundson | G02F 1/167 345/204 |
| 2005/0270619 A1 * | 12/2005 | Johnson | G02F 1/15 359/265 |
| 2006/0232531 A1 * | 10/2006 | Amundson | G02F 1/167 345/87 |

(Continued)

OTHER PUBLICATIONS https://en.wikipedia.org/wiki/Visual_control, as downloaded on Nov. 17, 2015.

(Continued)

*Primary Examiner* — Lun-Yi Lao
*Assistant Examiner* — Peter D McLoone
(74) *Attorney, Agent, or Firm* — Fish & Richardson P.C.

(57) ABSTRACT

The technology described in this document may be embodied in a method for controlling a display element. The method includes setting a first drive voltage configured to drive a first terminal of the display element such that the first drive voltage is set to a higher value than a second drive voltage configured to drive a second terminal of the display element. The first and second drive voltages can be configured to cause the display element to present a first display state. The method also includes performing adjustments to the first drive voltage and the second drive voltage such that the first drive voltage is less than the second drive voltage. The adjustments are configured in accordance with whether the display element is to present a second display state different from the first display state.

30 Claims, 8 Drawing Sheets

(56) References Cited

U.S. PATENT DOCUMENTS

| | | | |
|---|---|---|---|
| 2007/0002007 A1* | 1/2007 | Tam | G09G 3/38 345/105 |
| 2009/0128472 A1 | 5/2009 | Chen | |
| 2011/0013128 A1* | 1/2011 | Ginn | G02F 1/134327 349/122 |
| 2013/0114124 A1* | 5/2013 | Suwald | G02F 1/167 359/296 |

OTHER PUBLICATIONS

Bozena Poksinska, The current state of Lean implementation in health care: literature review, 2010, Quality Management in Health Care, (19), 4, 319-329.

Dahlgaard JJ, Peterstein J, Dahlgaard-Park SM. "Quality and lean health care: a system for assessing and improving the health of healthcare organisations" Total Quality Management, vol. 22, No. 6, Jun. 2011, 673-689.

Fillingham D, Can lean save lives? Leadership in Health Services vol. 20 No. 4, 2007 pp. 231-241.

Ford AL, Williams JA, Spencer M, McCammon C, Khoury N, Sampson T, Panagos P, Lee J Reducing Door-to-Needle Times using Toyota's Lean Manufacturing Principles and Value Stream Analysis, Stroke, Nov. 2012.

Kane M, Chui K, Rimicci J, et. al. Lean Manufacturing Improves Emergency Department Throughput and Patient Satisfaction, Journal of Nursing Administration, 2015:45(9): 429-434.

Nevo I, Fitzpatrick M, Thomas R-E et al. The Efficacy of Visual Cues to Improve Hand Hygiene Compliance. Simulation in Healthcare: The Journal of the Society for Simulation in Healthcare. 2010: 5(6): 325-331.

White BA, Chang Y, Grabowski BG, Brown DFM. Using Lean-Based Systems Engineering to Increase Capacity in the Emergency Department. Western J Emerg Med. 2014;15(7):770-776.

White BA, Chang Y, Grabowski BG, Brown DFM, "Whiteboards and discharge traffic lights: visual management in acute care" Australian Health Review. 2015, 39, 160-164.

International Search Report and Written Opinion, PCT/US2015/61092, mailed Feb. 3, 2016, 11 pages.

\* cited by examiner

DRIVING ELECTRO-OPTIC DISPLAYS

TECHNICAL FIELD

This application is directed to drivers for electro-optic displays.

BACKGROUND

Electro-optic displays such as electrochromic (EC) displays are examples of displays that have two or more display states (e.g., stable display states) differing from one another in at least one optical property. The optical property is typically color perceptible to the human eye. Application of electric fields may cause such displays to go from one display state to another. Examples of such display states include a visible or colored state, and a clear state or black state. For example, bistable displays feature two stable display states. Because power is only consumed when the display state is changed, EC displays lend themselves well to battery-powered application where conserving energy from limited resources is paramount.

SUMMARY

In one aspect, this document features a method of controlling a display element. The method includes setting a first drive voltage configured to drive a first terminal of the display element such that the first drive voltage is set to a higher value than a second drive voltage configured to drive a second terminal of the display element. The first and second drive voltages can be configured to cause the display element to present a first display state. The method also includes performing adjustments to the first drive voltage and the second drive voltage such that the first drive voltage is less than the second drive voltage. The adjustments are configured in accordance with whether the display element is to present a second display state different from the first display state.

In another aspect, this document features a system that includes a first driver, a second driver, and a controller. The first driver configured to drive a first terminal of a display element, and the second driver configured to drive a second terminal of the display element. The controller is configured to provide one or more control signals to the first and second drivers such that the control signals cause the first driver to generate a first drive voltage and cause the second driver to generate a second drive voltage. The first drive voltage is higher than the second drive voltage, and the first and second drive voltages are usable by the display element to present a first display state. The controller is also configured to provide one or more adjustment signals to the first and second drivers such that the adjustment signals cause adjustments to the first drive voltage and the second drive voltage such that the first drive voltage is less than the second drive voltage. The adjustments are configured in accordance with whether the display element is to present a second display state different from the first display state.

In yet another aspect, this document features one or more machine-readable storage devices that have encoded thereon computer readable instructions for causing one or more processors to perform various operations. The operations include setting a first drive voltage configured to drive a first terminal of the display element such that the first drive voltage is set to a higher value than a second drive voltage configured to drive a second terminal of the display element. The first and second drive voltages can be configured to cause the display element to present a first display state. The operations also include performing adjustments to the first drive voltage and the second drive voltage such that the first drive voltage is less than the second drive voltage. The adjustments are configured in accordance with whether the display element is to present a second display state different from the first display state.

Various implementations of the above aspects can include one or more of the following features.

The first drive voltage can be set to a higher value than a second drive voltage during a first time period, and the adjustments can be performed during a second time period following the first time period. During the first time period, a control signal can be provided for operating a switch that connects the second terminal to a power rail set at the second drive voltage. During the second time period, a control signal (also referred to as a connection signal) can be provided for operating a switch that connects the second terminal to a power rail set at the second drive voltage. The control signal can be provided responsive to determining that the display element is to present the second display state. The first drive voltage and the second drive voltage can be adjusted such that the first drive voltage is higher than the second drive voltage during a third time period that follows the second time period. During the third time period, a second control signal (or connection signal) can be provided, wherein the second control signal causes the switch to disconnect the second terminal from the power rail set at the second drive voltage. The second control signal can be provided responsive to determining that the display element is to present the second display state. The first terminal can be a common terminal, and the second terminal can be a pixel terminal of the display element. The first display state can represent a clear state of the display element, and the second display state can represent a colored state of the display element.

In some implementations, the technology described herein may provide one or more of the following advantages.

By providing two separately adjustable voltage outputs, the technology described herein may allow for generating various differential voltages between the two outputs. For example, for a display element needing +3V for setting and −3V for clearing, the two-output drive system can use a 3V power source to generate all the requisite drive voltages. This may obviate the need for a three-output drive system (which are kept fixed at 6V, 3V, and 0V, respectively), thereby potentially reducing power consumption and bulk (e.g., of additional power sources and/or boost circuitry) of the corresponding device. This may also allow the drive system to be controlled by microcontrollers without using additional power circuitry, thereby producing advantageous effects in the cost/size of the corresponding device.

DETAILED DESCRIPTION

The advent of wearable technology has produced various types of wearable devices for a wide range of applications. Some wearable devices, e.g., electronic wristbands developed for clinical settings, are intended to be light-weight, low-cost, low-power, and/or potentially disposable. Such wearable devices often have displays that need to be driven using drivers that are power-efficient as well as lightweight. Described herein is a driver system that may be suitable for driving display elements in power-constrained applications. While the description below primarily uses examples of wearable devices and displays used in such wearable devices, the technology can be used for various other applications where multiple drive voltages are needed for driving electronic components.

Figure 1A:
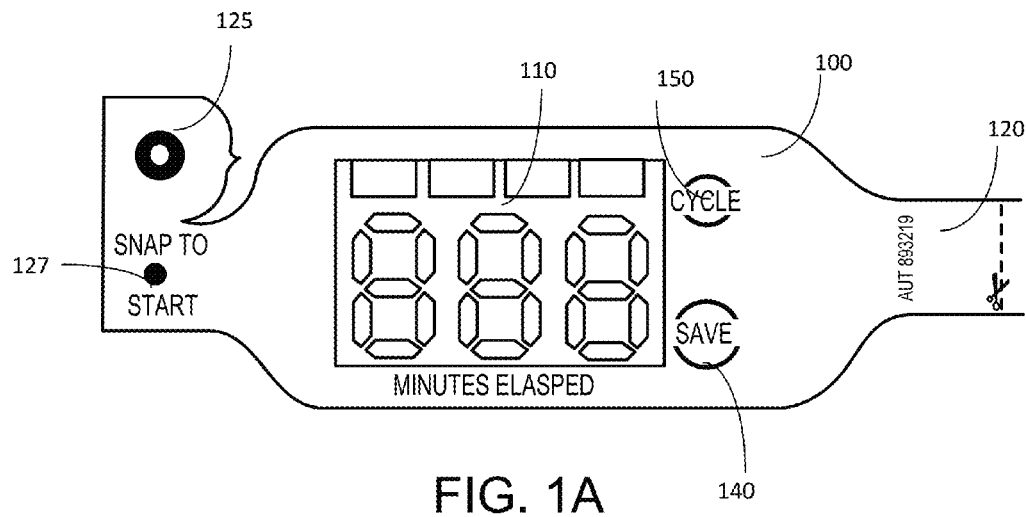
FIGS. 1A and 1B illustrate examples of a wearable device that can be used for tracking and saving information about time between clinical interventions at a medical facility.
Figure 1B:
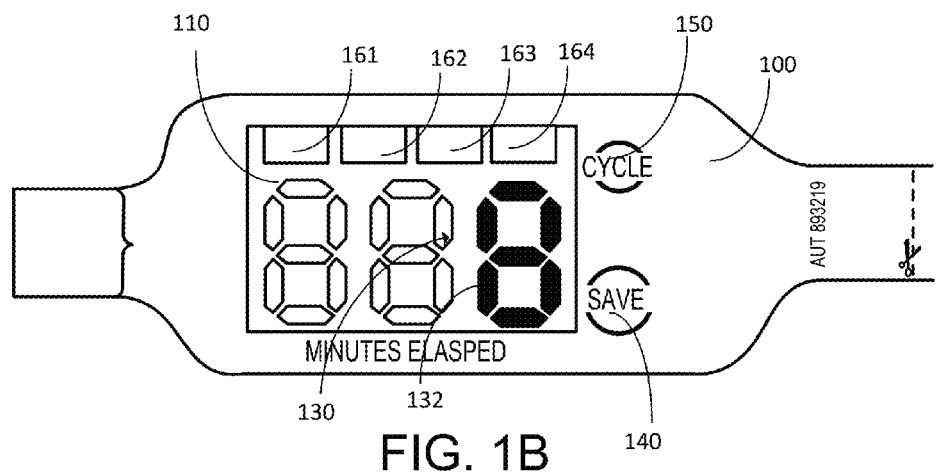

FIGS. 1A and 1B illustrate a wearable device 100 that can be used for tracking and saving information about time between clinical interventions at a medical facility. For example, the wearable device can be used to keep track of how long a patient has been waiting to see a doctor, receive assistance at a medical facility, etc. In this example, the wearable device 100 includes a display 110 to present a counter indicative of a duration of time, and to present information on time (e.g., number of minutes) between interventions as documented during an emergency event. The wearable device 100 also includes a band 120 that can wrap around the wrist of the patient, and can be secured to the wrist using a fastening mechanism such as the button 125 and the hole 127. In some implementations, the button 125 and the hole 127 can provide additional functionality such as an activation mechanism for the display 110. For example, the button 125 and the hole 127 can include circuitry such that once the button is pressed onto the hole for longer than a predetermined duration (e.g., a few seconds), a control signal is sent to the display 110 to activate the display. Once the display is turned on, a count can be initiated (for example, with starting digit 130) that increments to reflect the passage time.

The examples in this document primary refer to electro-optic displays such as electrochromic (EC) displays. EC displays function based on the electrochromism effect, which is an effect observable in some materials (often referred to as electrochromic materials) that change color, for example, when a burst of charge causes electrochemical redox reactions in the materials. While this document primarily uses examples of EC displays, the technology described herein may be used for other types of displays, including other types of reflective displays, transflective displays, transmissive displays, and emissive displays. Examples of display technologies that may use the described technology include electroluminescent displays, electrophoretic displays, cholesteric displays, electrowetting displays, liquid crystal displays (LCDs) (e.g., twisted nematic LCDs, super-twisted nematic LCDs, ECB LCDs, cholesteric LCDs, ferroelectric LCDs, vertically-aligned LCDs, in-plane switching LCDs), organic light emitting diode displays, plasma displays, or other displays that are driven using two or more drive voltages. The display 110 can be configured to present various types of information by corresponding arrangements of one or more display elements 132. As shown in FIG. 1B, the display 110 includes a plurality of display elements to represent an integer digit (e.g., seven individual segments, each of which is implemented using a display element 132). Some of the display elements can be arranged such that various sets of the display elements can be selectively activated (e.g., set to a colored display state) or deactivated (e.g., set to a different color display state, a white display state, a black display state, or a clear display state) to display one or more digits. In some implementations (e.g., for EC displays), the display state can be stable. In such cases, energy is applied to effect a change in the display state, but the display element maintains a display state even when the source of the energy is removed. This is referred to as the persistence effect.

In the examples of FIGS. 1A and 1B, the display 110 includes display elements arranged to present three digits, each of which include seven display elements capable of representing the digits "0" to "9". In some implementations, one or more display elements can also be used to present other types of information separate from integer digits. For example, the display 110 can include one or more display elements 161-164 that represent the number of stored time values. To provide such functionality, the wearable device 100 includes a save button 140 for storing, at various time points, time values as tracked by the wearable device 100. For example, a count presented on the display 110 can be stored by pressing the save button 140 for a predetermined duration of time (for example, 2 seconds). In some implementations, upon storing a value (e.g., the last displayed value) the count being presented on the display 110 may reset (e.g., to a zero value). In some implementations, the save operation may store the count without resetting the counter. For other functionality, the wearable device 100 may have a preset time (which may be referred to as an "ideal reset time") after which the device resets. For example, the device 100 can be configured to reset every 20 minutes. The number of reset points (or time points at which the time values are stored) can be visually presented on the display 110 using the display elements 161-164. In some implementations, one of the digits of the display 110 can also be used to present the reset points.

Figure 1C:
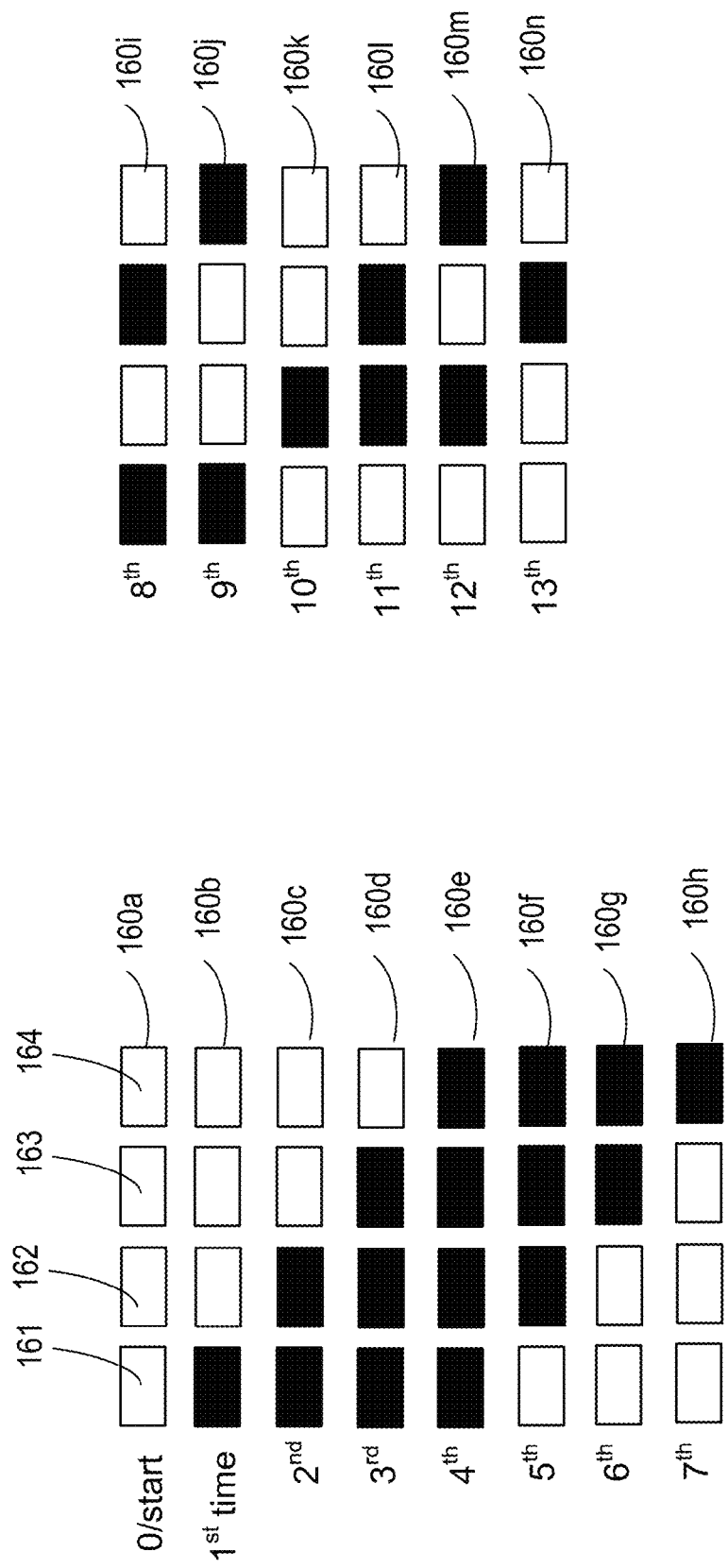
FIG. 1C illustrates activation patterns of display elements within a display of the wearable device.

The display elements 161-164 can be used to visually present the number of reset points (and/or the number of stored time values) in various ways. Example activation patterns (160a-160n, 160 in general) for the display elements 161-164 are shown in FIG. 1C. For example, when no time values are stored, none of the four display elements 161-164 is activated. The activation pattern 160a represents this scenario. The first reset point can be represented using the activation pattern 160b, and subsequent reset points can be represented using the activation patterns 160c-160n. Other schemes of activating the display elements 161-164 are also possible. For example, the display elements can be used to represent binary digits (e.g., with an activated or colored condition representing a binary 1, and a clear condition representing a binary 0).

Referring again to FIGS. 1A and 1B, in some implementations the wearable device 100 includes a cycle button 150. Activating the cycle button 150 (e.g., by pressing and holding the button) can initiate a management mode of the wearable device 100 in which all the stored reset points and/or corresponding time values are displayed sequentially. The cycle button 150 can be held at any time after the display 110 has been activated to place the device 100 into the management mode. For each time value presented on the display 110, the corresponding reset point can also be presented using, for example, an associated activation pattern 160 (shown in FIG. 1C). Each stored time value can be displayed for a predetermined duration (for example, a few seconds) before moving to the next stored time value. After the last stored time value is displayed, the display may continue to cycle through the stored time values once again starting from the first stored time value. In some implementations, activating the management mode can cause a suspension of the time tracking functionality of the device 100. For example, while in the management mode, the wearable device 100 may not continue to run the counter, store a new time value, etc. Deactivating the cycle button 150 (e.g., by releasing the button) can terminate the management mode.

In some implementations, the display elements 132 can be EC display elements. EC display elements having low power consumption and good contrast may in some cases be advantageous for the wearable device 100. By activating and deactivating various sets of display elements 132, integer digits and other types of information can be presented on the display 110. Each display element 132 can be activated (set to a color state) or deactivated (set to a clear state) by applying predetermined voltages at two terminals (e.g., electrodes) of the display element 132. These two terminals are often individually referred to as a pixel terminal and a common terminal, respectively. In some cases, the common terminal is maintained at a reference potential, and +3V or −3V relative to the reference is applied at the pixel terminal to color or clear, respectively, the display element. This can be done, for example, by connecting the common electrode or terminal to a voltage line (also referred to herein as a "rail") maintained at a substantially constant potential of 3V, and using transistor logic to connect the pixel terminal to either a rail that is maintained at 6V (+3V relative to common) to color, or another rail that is maintained at 0V (−3V relative to common) to clear. However, the batteries, boost circuitry, etc. needed to generate the 6V range, using a three-output drive system may not always be feasible for portable, lightweight, and low-cost electronics such as that used in the wearable device 100.

The technology described herein provides a two-output drive system in which the voltage on each of the two outputs are separately adjustable. Using such a two-output drive system, the voltages on the pixel terminal and the common terminal of a display element 132 can be separately adjusted to provide the voltages needed for coloring or clearing the display elements 132. Therefore, rather than using three rails set at fixed voltages, the two-output drive system allows for display elements 132 to be set to both colored and clear states using only two adjustable voltage outputs. For a display element needing +3V for setting and −3V for clearing, the two-output drive system can use a 3V power source, thereby reducing power consumption and bulk (e.g., of additional power sources and/or boost circuitry) as compared to a three-output drive systems requiring a 6V range. This also allows the display elements 132 to be controlled by microcontrollers without using additional power circuitry, which can increase the cost/size of the overall device 100. In addition, the drive system described herein uses the persistence effect of EC display elements and avoids consuming power to keep such EC display element colored.

Figure 2A:
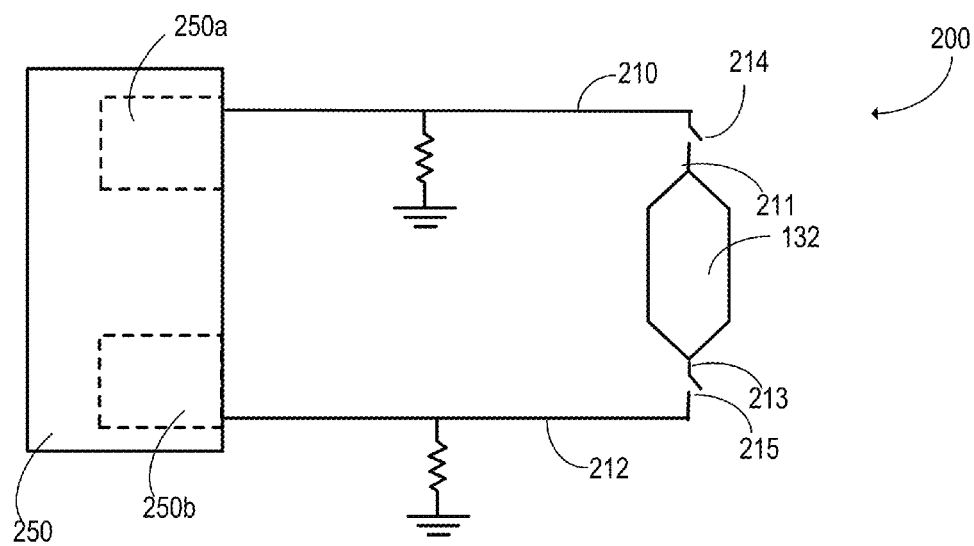
FIG. 2A is a schematic illustration of a two-output driving scheme for a display element.

FIG. 2A is a schematic illustration of a two-output driving system 250 for driving an individual display element 132 (e.g., one of seven segments). The drive system 250 includes two drivers 250a and 250b that can independently drive two power rails 210 and 212, respectively. The driver 250a is configured to set a drive voltage on the power rail 210, and the driver 250b is configured to set a drive voltage on the power rail 212. The drive voltages on the rails 210 and 212 can be adjusted independently of one another. The display element 132 includes a pixel terminal 211 and a common terminal 213 that can be connected or disconnected to the rail 210 (also referred to as the pixel rail) and the rail 212 (also referred to as the common rail), respectively. The connection between the pixel terminal 211 and the pixel rail 210 can be controlled using a switch 214, and the connection between the common terminal 213 and the common rail 212 can be controlled using a switch 215. The switches 214 and 215 can be implemented, for example, using transistors that can be switched on and off using control signals from a controller device such as a microcontroller, microprocessor, digital signal processor, etc. When a switch is opened (e.g., turned off), the corresponding terminal is referred to be in a high impedance state (referred to herein as a high-Z state).

The drive voltages on the pixel rail and the common rail can be independently adjusted to set the display element 132 in the colored or clear states. For example, to set or color the display element 132 using a +3V drive voltage, the drive voltage on the common rail 212 is set to 0V, and the drive voltage on the pixel rail 210 is set to 3V. Under such conditions, because the voltage difference between the pixel and common terminal ($V_{PC}$) is +3V, the display element 132 is set to colored state. To clear or bleach the display element 132 using a −3V signal, the drive voltage on the common rail 212 is set to 3V, and the drive voltage on the pixel rail 210 is set to 0V. Under this condition, the voltage difference between the pixel and common terminals ($V_{PC}$) is −3V, and therefore the display element 132 is set to a clear state. In some implementations, once the display element 132 is colored or cleared, the pixel terminal and/or the common terminal can be electrically disconnected from its corresponding rail, for example, using the switches 214 and 215, respectively. Upon being disconnected, the terminal is placed into a high-impedance (high Z) state and the display state of the display element remains substantially unchanged, for example, due to the persistence effect.

Figure 2B:
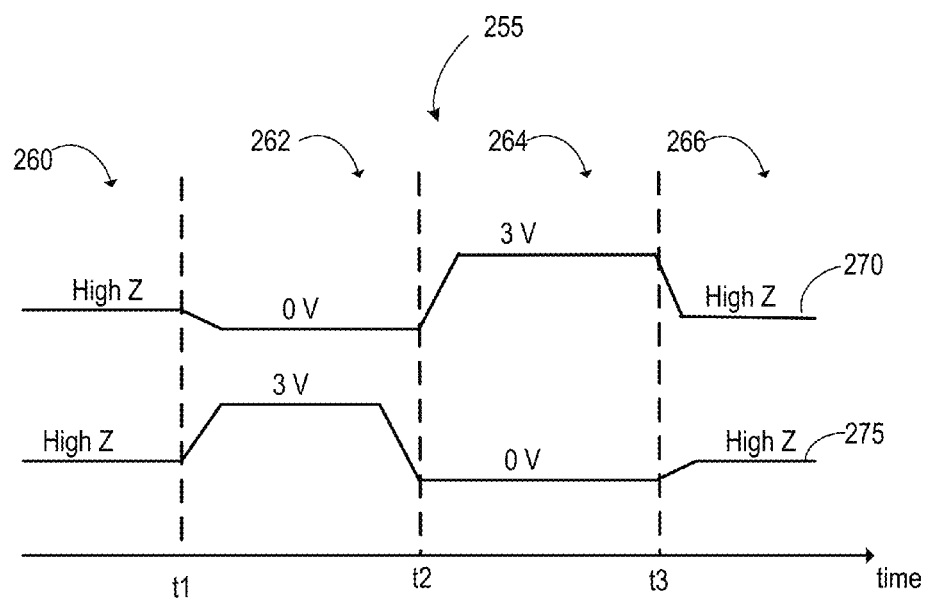
FIG. 2B illustrates a timing diagram associated with the driving scheme of FIG. 2A.

FIG. 2B illustrates a timing diagram 255 associated with the driving system of FIG. 2A. The timing diagram 255 shows an example of how a drive voltage 270 on the pixel rail 210 and a drive voltage 275 on the common rail 212 are adjusted over time to drive the display element 132 to attain different display states. In this example, during the initial time period 260, both the common terminal 213 and the pixel terminal 213 are in the high Z state, and therefore, the display element 132 is in the persistence state. At time t1, the drive voltage 270 and the drive voltage 275 are set to 0V and 3V, respectively, and these voltages are maintained during the time period 262. During the time duration 262, once the drive voltages ramp up/down to the set values, the voltage difference between the pixel and common rails is $V_{PC}=-3V$. Accordingly, as soon as the pixel terminal 211 and common terminal 213 are connected to the corresponding rails, the display element 132 is taken out of the high-Z state and set to the cleared display state. The combination of drive voltages on the pixel rail 210 and the common rail 212 during the time period 262 can be considered as a clear pulse of the driving system 250.

At time t2, the drive voltage 270 and the drive voltage 275 are being driven to 3V and 0V, respectively, and these voltages are maintained during the time period 264. During the time duration 264, once the drive voltages ramp up/down to the set values, the differential voltage between the pixel and common rails is $V_{PC}=3V$. Accordingly, the display element 132 is set to the colored display state. The combination of drive voltages on the pixel rail 210 and the common rail 212 during the time period 264 can be considered as a color pulse of the driving system 250.

At time t3, both the pixel terminal and the common terminal are electrically disconnected from the pixel rail and the common rail, respectively, to set the terminals in a high-Z state. Under this situation, the display element maintains the color state due to the persistence effect even if both drive voltages are set to 0V. By not having to provide a drive voltage on either rail until a change of state is required, the two-output drive system can provide significant power efficiency for wearable devices such as the device 100.

Figure 3:
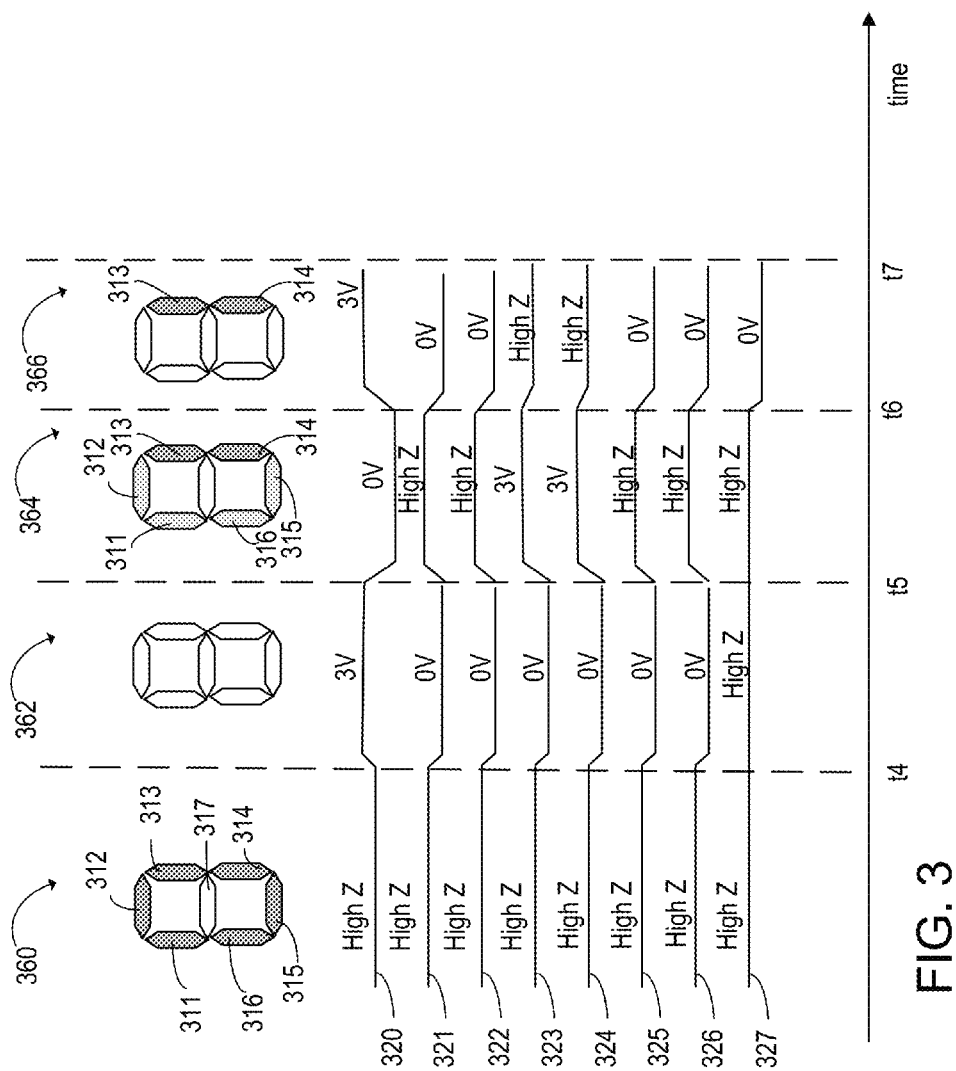
FIG. 3 illustrates an example scheme for displaying digits using multiple display elements.

FIG. 3 illustrates an example of displaying digits using multiple display elements. In particular, FIG. 3 shows a timing diagram associated with multiple display elements (i.e., seven elements) to change a displayed digit from "0" to "1". During time period 360, display elements 311-316 are in a colored display state, and the display element 317 is in a clear display state, and thus the combination of the display elements 311-317 displays the digit "0". Each of the display elements 311-317 can be substantially same as the display element 132 described above with reference to FIG. 2A. The common terminal of each of the display elements 311-317 is connected (via a corresponding switch) to the common drive rail. The trace 320 represents the drive voltage at the common terminal of each of the display elements 311-317. The pixel terminal of each of the display elements 311-317 is connected (via a corresponding switch) to the pixel drive rail. The traces 321-327 represent the drive voltage at the pixel terminals of the display elements 311-317, respectively. The drive voltages can be generated by a two-output drive system substantially similar to the drive system 250 described with reference to FIG. 2A.

During the time period 360, digit "0" is displayed and the pixel and the common terminals of all the display elements 311-317 are disconnected from the corresponding rails, and therefore are in the high Z state. To change the change the displayed digit (in this example, from "0" to "1"), the display driver generates a clear pulse to clear each of the display elements 311-316 that was in a colored state during the time period 360. This can include setting the drive voltage in the common rail to +3V, setting the drive voltage in the pixel rail to 0V, and connecting each of the display elements 311-316 to the pixel and common rails via the corresponding switches. This results in a differential voltage $V_{PC}=-3V$ for the display elements connected to the rails, and those elements are therefore set to a clear display state. This is illustrated by the states of the display elements during the time period 362. Because the display element 317 was in the clear state during the time period 362, the pixel terminal of the display element 317 can be maintained in the high Z state (as indicated by the trace 327).

In order to display the digit "1", the display elements 313 and 314 each needs to be set to a colored display state. This can be initiated at time t5 by setting the drive voltage in the common rail to 0V, setting the drive voltage in the pixel rail to 3V, and connecting each of the display elements 313 and 314 to the pixel and common rails via the corresponding switches. This results in a differential voltage $V_{PC}=+3V$ for the display elements connected to the pixel rails, and those elements are therefore set to a colored display state. The drive voltages on the pixel terminals of the display elements 313 and 314 during the time period 364 are illustrated by the traces 323 and 324, respectively. Because the other display elements (i.e., the display elements 331, 312, and 315-317 are not set to a colored display state, the switches that connect the corresponding pixel terminals to the pixel rail are changed to (or maintained in) an OFF configuration thereby disconnecting the corresponding pixel terminals from the pixel rail. This is illustrated using the high-Z status of the corresponding traces 321, 322, and 325-327, respectively.

In some implementations, even when the switch corresponding to a particular display element is in an OFF state, a leakage current may still flow through the display element. Therefore, if there is a residual charge on the display element, the display element may still show some coloration. In the example of FIG. 3, the display elements 311, 312, 315 and 316, which were in a colored state during the time period 360, may exhibit a partially colored interim display state during the time period 364 even when the display element terminals are in a high-Z state. On the other hand, because the display element 317 was in a clear state during time period 360, the amount of residual charge in the display element may be negligible, and therefore the display element 317 may not exhibit the interim display state.

In some implementations, where one or more of the display elements exhibit the interim display state, a clear pulse may be selectively provided to those particular display elements to forcibly drive the particular display elements to a clear display state. This can also be done by selectively providing the clear pulse to all the display elements that are not intended to be in a colored state (e.g., all display elements that either exhibit the interim state or are in a clear state already). In the example of FIG. 3, during the time period 364, the display elements 311, 312, 315, and 316 exhibit the interim display state, and the display element 317 is in a clear state. A clear pulse can therefore be sent to the display elements 311, 312, and 315-317 to forcibly clear all display elements but the ones (display elements 313 and 314, in this example) that are intended to be in the colored state. This can be initiated at time t6 by setting the drive voltage in the common rail to +3V, setting the drive voltage in the pixel rail to 0V, and connecting each of the display elements 311, 312, and 315-317 to the pixel and common rails via the corresponding switches. This results in a differential voltage $V_{PC}=-3V$ for the display elements connected to the rails, and those elements are therefore set to a clear display state. As illustrated by the portions of the traces 323 and 324 in the time period 366, the display elements 313 and 314 are disconnected from the drive voltage rails such that those display elements are unaffected by the clear pulse, and continue to display the colored display state.

In some implementations, the time periods 360, 362, 364, and 366 may have different time durations. For example, the duration of primary clear pulse (i.e., the pulse in the time period 362) and the primary color pulse (i.e., the pulse in the time period 364) can be about 500 ms. The time duration of the secondary clear pulse (i.e., the pulse in the time period 366) can be about 200 ms. The duration of the time periods can depend on various factors, including, for example, environmental humidity, display degradation, display architecture, power output of the logic and battery voltage degradation. In some implementations, as the performance of the power supply to the drive system degrades (for example, by providing lower power outputs), the display elements may require more clearing time. As a result, the time period 362 corresponding to the clearing pulse and the time period 364 corresponding to the secondary pulse can increase over time. For example, for a degraded power supply, the above time periods can increase in duration by 1 ms for every 5 minutes the device runs on the degraded power supply.

Figure 4:
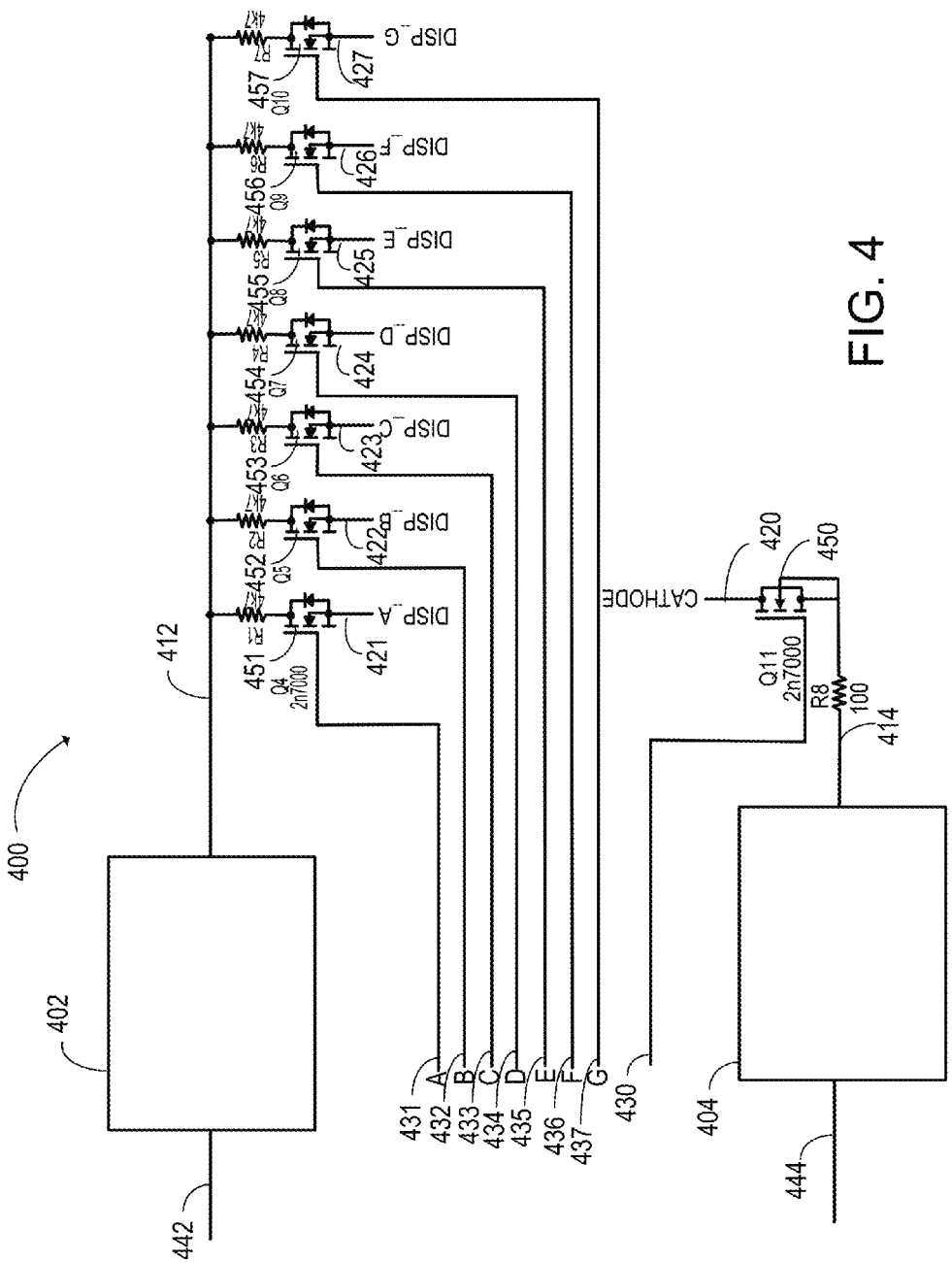
FIG. 4 is a schematic diagram representing an example of a circuit used for driving multiple display elements.

FIG. 4 is a schematic diagram representing an example of a circuit 400 used for driving multiple display elements (e.g., a set of seven display elements that can together display different digits). The circuit 400 includes a first driver 402 that can be used to set and adjust a drive voltage on a pixel rail 412. The circuit also includes a second driver 404 that that can be used to set and adjust a drive voltage on a common rail 414. In this example, the drivers 402 and 404 can be individually controlled to set either a 3V or a 0V potential on the pixel rail 412 and the common rail 414, respectively. A first control signal is provided the driver 402 via the control line 442, and a second control signal is provided to the driver 404 via the control line 444. The first and second control signals can be provided, for example, by logic circuitry or a microcontroller and cause the respective drivers to set either a 0V or a 3V on the corresponding rails. The drivers 402 and 404 can include circuitry (e.g., switches such as transistors) for selecting between a 0V and 3V supply.

The circuit 400 also includes switches 451-457 arranged to connect or disconnect the pixel rail 412 from the corresponding pixel terminals of the different display elements via the switch terminals 421-427, respectively. In the example shown in FIG. 4, the switches 451-457 include transistors that can be controlled by providing control signals over the control lines 431-437, respectively, to turn the switches on or off. In some implementations, the control signals can be provided from a controller (e.g., a microcontroller, microprocessor, or DSP) to place the corresponding terminal in or out of a high-Z state. If a particular switch is turned on by a control signal, the corresponding terminal is connected to the pixel rail 412. On the other hand, if a particular switch is turned off by a control signal, the corresponding terminal is disconnected from the pixel rail, and therefore placed in a high-Z state.

The circuit 400 also includes a switch 450 arranged to connect or disconnect the common rail 414 from the common terminals of the various display elements. In some implementations, the common terminals of the display elements may be electrically connected and coupled to the switch terminal 420, such that all the common terminals of all the display elements can be taken in and out of a high-Z state simultaneously. The switch 450 can include a transistor that can be controlled by providing control signals over the control line 430, to turn the switch on or off. The control signals can be provided from the controller providing the control signals for the pixel terminals. If the switch 450 is turned on by a control signal, the common terminals of all the display elements are connected to the common rail 414. If the switch 450 is turned off by a control signal, the common terminals of all the display elements are disconnected from the common rail, and therefore placed in a high-Z state.

Figure 5:
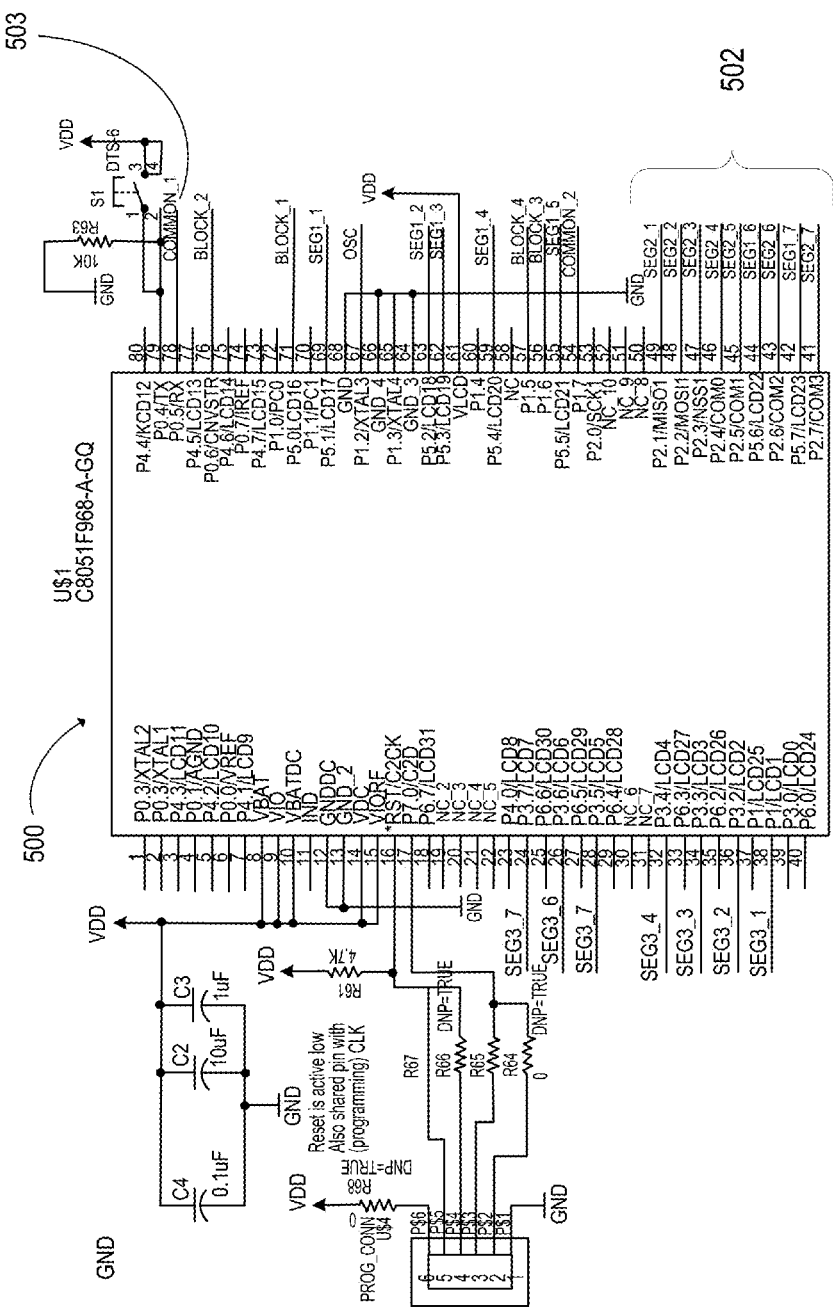
FIG. 5 is a schematic diagram representing one particular example of a circuit used for driving multiple display elements.

FIG. 5 is a schematic diagram representing one particular example of a circuit used for driving multiple display elements. In this figure, the integrated circuit 500 is a microcontroller capable of outputting two drive voltages (0V and 3V) as well as a high-impedance state for three separate display elements. Unlike the circuit 400 of FIG. 4, where the control lines 431-437 are connected to switches such as control transistors that connect power rails to the display, the circuit 500 includes control lines 502 that are directly connected to the display to provide the 0V/3V/high-impedance needed to change or maintain a display state. For example, to set a colored display state, the microcontroller can be programmed to provide 0V on the COMMON pin 503 and 3V on the pin(s) connected to the pixel(s) or display element(s) desired to be colored. Once the colored display state is set, the pixel and COMMON pins may be set to high-impedance states to maintain the color using the persistence feature of the display element. To clear a display state, the microcontroller can be programmed to provide 3V on the COMMON pin 503 and 0V on the pin(s) connected to the pixel(s) desired to be cleared. Once cleared, the pixel and COMMON pins may be set to high-impedance states. As shown in FIG. 5, the integrated circuit 500 may be connected to additional external circuitry used for programming the microcontroller and maintaining an accurate time for use in the device shown in FIGS. 1A and 1B.

Figure 6:
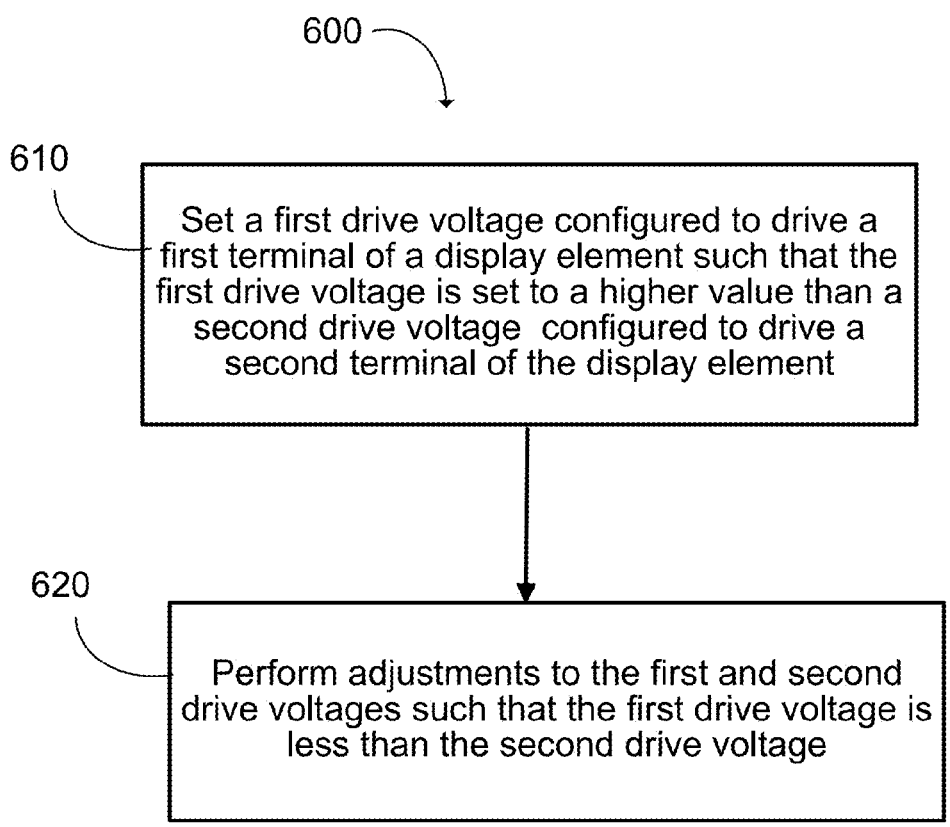
FIG. 6 illustrates a flowchart.

FIG. 6 shows a flowchart depicting an example of a process 600 for driving a two-output drive system. In some implementations, the process 600 can be implemented, at least in part, using a drive system 250 described above with reference to FIG. 2A, or using a drive system including the drivers 402 and 404 described with reference to FIG. 4. Implementation of the process 600 can also include use of one or more processing devices such as microcontrollers, microprocessors or DSPs. Operations of the process 600 can include setting a first drive voltage configured to drive a first terminal of the display element (610). The first drive voltage can be set to a higher value than a second drive voltage, wherein the second drive voltage is configured to drive a second terminal of the display element. In some implementations, the first and second drive voltages are configured such that the two drive voltages in combination cause the display element to present a first display state. For example, the two drive voltages can be used in conjunction to produce the differential voltage $V_{PC}$ that causes coloring and clearing of display elements 132 described with reference to FIG. 2A. For example, for an EC display element, the first drive voltage can be set to +3V and the second drive voltage can be set to 0V to provide a differential voltage of $V_{PC}=-3V$. The first and second terminals can be the common and pixel terminals, respectively of a display element.

In some implementations, the first drive voltage is set to a higher value than a second drive voltage during a first time period to clear the display element. This can include providing, during the first time period, a control signal for operating a switch that connects the second terminal to a power rail set at the second drive voltage. The power rail can be substantially similar to the pixel rail 210 described with reference to FIG. 2A, or the pixel rail 412 described with reference to FIG. 4. This can also include providing, during the first time period, a control signal for operating another switch that connects the first terminal to another power rail set at the first drive voltage. The power rail set at the first drive voltage can be substantially similar to the common rail 212 described with reference to FIG. 2A, or the common rail 414 described with reference to FIG. 4.

Operations of the process 600 also includes performing adjustments to the first drive voltage and the second drive voltage such that the first drive voltage is less than the second drive voltage (620). The adjustments are configured in accordance with whether the display element is to present a second display state different from the first display state. For example, if the display element is an EC display element that is to be set to a colored state, the first drive voltage (which may be provided on a common rail) can be set to 0V and the second drive voltage (which may be provided on a pixel rail) can be set to 3V to provide a differential voltage of $V_{PC}=3V$.

Setting the display element to a colored state can also include providing a control signal for operating a switch that connects the second terminal to a power rail set at the second drive voltage. For example, if a particular display element is to be set to a colored state, a control signal can be provided to close the switch such that the second terminal (e.g., the pixel terminal) of the display element is connected to the power rail (e.g., the pixel rail) carrying the second drive voltage. On the other hand, if the display element is not to be set to a colored state, the switch is kept open, or opened using a control signal, such that the second terminal of the display element is disconnected from the power rail carrying the second drive voltage.

In some implementations, even when the second terminal of the display element is disconnected from the power rail carrying the second drive voltage, the display element may exhibit the interim display state (described above with reference to FIG. 3) due to residual charges on the element. In such cases, the first drive voltage and the second drive voltage can be adjusted again such that the first drive voltage is higher than the second drive voltage. The first and second drive voltages are adjusted to provide another clearing pulse to the display element. This can include connecting the display element to the power rails via the appropriate switches such that the display element is driven from the interim state to the clear state. On the other hand, if the display element is intended to be maintained in a colored state, the display element is disconnected from the pixel rail such that the display element is unaffected by any clear pulse provided using the pixel rail, and continues to be in the colored state, for example, due to persistence effect.

Figure 7:
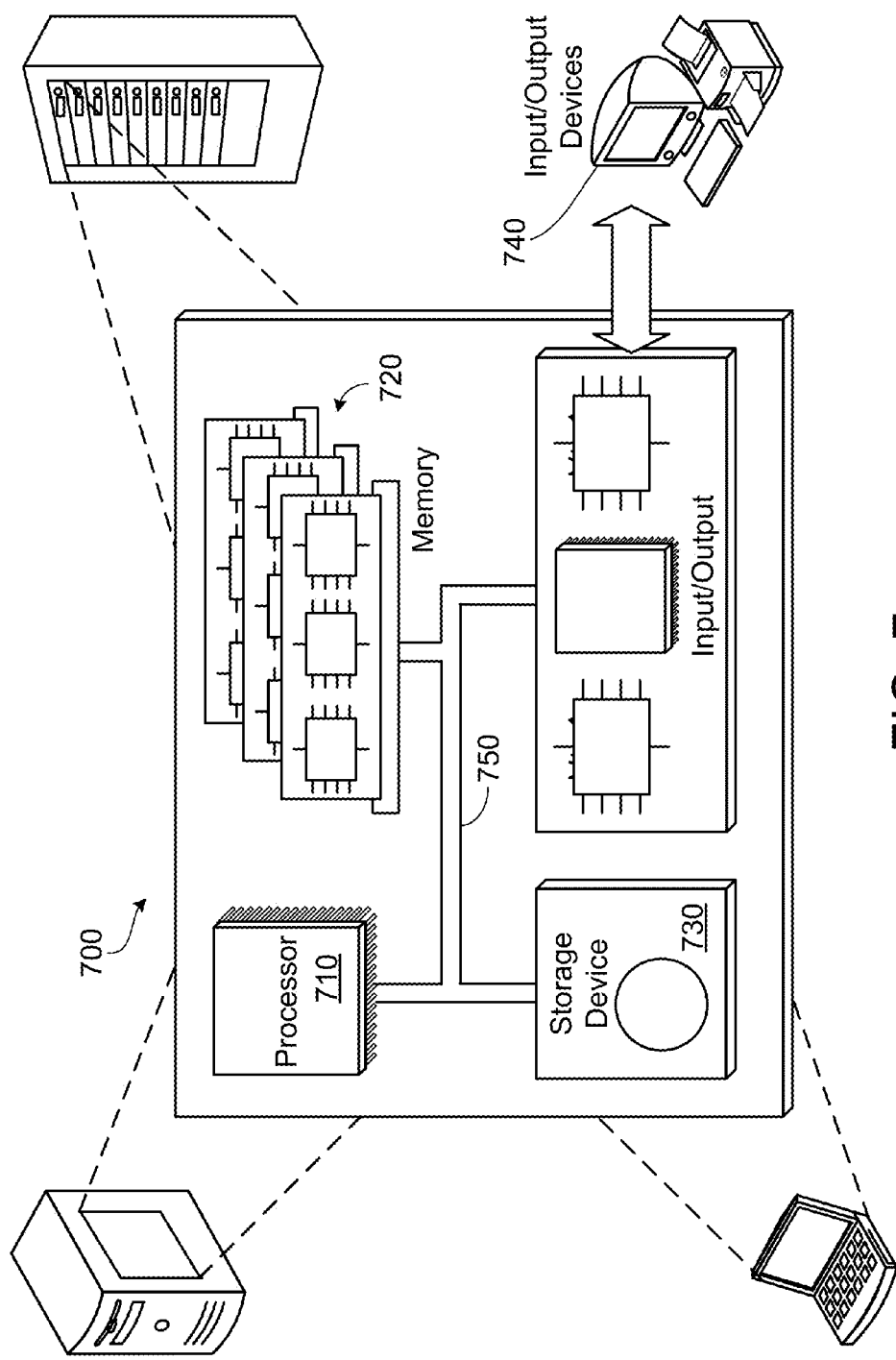
FIG. 7 illustrates an example of a computing device.

FIG. 7 is a schematic diagram of a generic computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a touch panel, a CRT (cathode ray tube), or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications can be made without departing from the spirit and scope of the processes and techniques described herein. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method of controlling multiple display elements, the method comprising:
   setting a first drive voltage on a first voltage rail configured to drive a first terminal of each of the multiple display elements;
   setting a second drive voltage, less than the first drive voltage, on a second voltage rail configured to drive a second terminal of each of the multiple display elements, wherein the second terminal of each of the multiple display elements is connected to the second voltage rail via a corresponding switch;
   providing a first control signal configured to activate each of a first set of one or more of the switches to connect corresponding display elements to the second voltage rail, such that the voltages on the first and second voltage rails cause the corresponding display elements to present a first display state;
   performing adjustments to the first drive voltage and the second drive voltage such that the first drive voltage is less than the second drive voltage; and
   providing a second control signal configured to activate each of a second set of one or more of the switches to connect corresponding display elements to the second voltage rail, wherein the second set of switches is selected in accordance with whether the corresponding display elements are to present a second display state different from the first display state.

2. The method of claim 1, wherein the second drive voltage is less than the first drive voltage during a first time period, and the adjustments are performed during a second time period following the first time period.

3. The method of claim 2, wherein the first control signal to each of the first set of one or more of the switches is provided during the first time period.

4. The method of claim 2, wherein the second control signal to each of the second set of one or more of the switches is provided during the second time period.

5. The method of claim 4, further comprising adjusting the first drive voltage and the second drive voltage such that the first drive voltage is higher than the second drive voltage during a third time period that follows the second time period.

6. The method of claim 5, further comprising providing, during the third time period, a third control signal to each of one or more of the switches, the third control signal configured to cause the one or more switches to disconnect the corresponding second terminals from the second voltage rail, wherein the third control signal is provided to each of the one or more switches responsive to determining that the corresponding display elements are to present the second display state.

7. The method of claim 1, wherein the first terminal is a common terminal, and the second terminal is a pixel terminal.

8. The method of claim 1, wherein the first display state represents a clear state.

9. The method of claim 1, wherein the second display state represents a colored state.

10. The method of claim 1, wherein the first terminal of each of the multiple display elements is connected to each other, and connected to the first voltage rail via a corresponding switch.

11. A system comprising:
   a first driver configured to set a voltage on a first voltage rail connected to a first terminal of each of multiple display elements;
   a second driver configured to set a voltage on a second voltage rail connected to a second terminal of each of the multiple display elements, wherein the second terminal of each of the multiple display elements is connected to the second voltage rail via a corresponding switch; and
   a controller configured to:
      cause the first driver to generate a first drive voltage and cause the second driver to generate a second drive voltage, wherein the first drive voltage is higher than the second drive voltage, and the first and second drive voltages are usable by the display element to present a first display state,
      provide a first control signal configured to activate each of a first set of one or more of the switches to connect corresponding display elements to the second voltage rail,
      cause adjustments to the first drive voltage and the second drive voltage such that the first drive voltage is less than the second drive voltage,
      provide a second control signal configured to activate each of a second set of one or more of the switches to connect corresponding display elements to the second voltage rail, wherein the second set of switches is selected in accordance with whether the corresponding display elements are to present a second display state different from the first display state.

12. The system of claim 11, wherein the second drive voltage is less than the first drive voltage during a first time period, and the adjustments are performed during a second time period following the first time period.

13. The system of claim 12, wherein the first control signal to each of the first set of one or more of the switches is provided during the first time period.

14. The system of claim 12, wherein the second control signal to each of the second set of one or more of the switches is provided during the second time period.

15. The system of claim 14, wherein the controller is configured to adjust the first drive voltage and the second drive voltage such that the first drive voltage is higher than the second drive voltage during a third time period that follows the second time period.

16. The system of claim 15, wherein the controller is configured to provide, during the third time period, a third control signal to each of one or more of the switches, the third control signal configured to cause the one or more switches to disconnect the corresponding second terminals from the second voltage rail, wherein the third control signal is provided to each of the one or more switches responsive to determining that the corresponding display elements are to present the second display state.

17. The system of claim 11, wherein the first terminal is a common terminal, and the second terminal is a pixel terminal.

18. The system of claim 11, wherein the first display state represents a clear state.

19. The system of claim 11, wherein the second display state represents a colored state.

20. The system of claim 11, wherein the first terminal of each of the multiple display elements is connected to each other, and connected to the first voltage rail via a corresponding switch.

21. One or more non-transitory machine-readable storage devices having encoded thereon computer readable instructions for causing one or more processors to perform operations comprising:
- setting a first drive voltage on a first voltage rail configured to drive a first terminal of each of multiple display elements;
- setting a second drive voltage, less than the first drive voltage, on a second voltage rail configured to drive a second terminal of each of the multiple display elements, wherein the second terminal of each of the multiple display elements is connected to the second voltage rail via a corresponding switch;
- providing a first control signal configured to activate each of a first set of one or more of the switches to connect corresponding display elements to the second voltage rail, such that the voltages on the first and second voltage rails cause the corresponding display elements to present a first display state;
- performing adjustments to the first drive voltage and the second drive voltage such that the first drive voltage is less than the second drive voltage; and
- providing a second control signal configured to activate each of a second set of one or more of the switches to connect corresponding display elements to the second voltage rail, wherein the second set of switches is selected in accordance with whether the corresponding display elements are to present a second display state different from the first display state.

22. The one or more machine-readable storage devices of claim 21, wherein the second drive voltage is less than the first drive voltage during a first time period, and the adjustments are performed during a second time period following the first time period.

23. The one or more machine-readable storage devices of claim 22, wherein the first control signal to each of the first set of one or more of the switches is provided during the first time period.

24. The one or more machine-readable storage devices of claim 22, wherein the second control signal to each of the second set of one or more of the switches is provided during the second time period.

25. The one or more machine-readable storage devices of claim 24, further comprising instructions for adjusting the first drive voltage and the second drive voltage such that the first drive voltage is higher than the second drive voltage during a third time period that follows the second time period.

26. The one or more machine-readable storage devices of claim 25, further comprising instructions for providing, during the third time period, a third control signal to each of one or more of the switches, the third control signal configured to cause the one or more switches to disconnect the corresponding second terminals from the second voltage rail, wherein the third control signal is provided to each of the one or more switches responsive to determining that the corresponding display elements are to present the second display state.

27. The one or more machine-readable storage devices of claim 21, wherein the first terminal is a common terminal, and the second terminal is a pixel terminal.

28. The one or more machine-readable storage devices of claim 21, wherein the first display state represents a clear state.

29. The one or more machine-readable storage devices of claim 21, wherein the second display state represents a colored state.

30. The one or more machine-readable storage devices of claim 21, wherein the first terminal of each of the multiple display elements is connected to each other, and connected to the first voltage rail via a corresponding switch.

* * * * *